(12) United States Patent
Newberry et al.

(10) Patent No.: US 9,718,449 B2
(45) Date of Patent: Aug. 1, 2017

(54) BRAKING CONTROL SYSTEM

(71) Applicant: JAGUAR LAND ROVER LIMITED, Warwickshire (GB)

(72) Inventors: Anna Newberry, Conventry (GB); Timothy Reynolds, Coventry (GB); Anthony Satterthwaite, Coventry (GB); Martin Holly, Coventry (GB); Richard Devenport, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 319 days.

(21) Appl. No.: 14/405,425

(22) PCT Filed: Jun. 7, 2013

(86) PCT No.: PCT/EP2013/061785
§ 371 (c)(1),
(2) Date: Dec. 4, 2014

(87) PCT Pub. No.: WO2013/182674
PCT Pub. Date: Dec. 12, 2013

(65) Prior Publication Data
US 2015/0149055 A1    May 28, 2015

(30) Foreign Application Priority Data

Jun. 7, 2012    (GB) .................................. 1210066.5

(51) Int. Cl.
*B60T 8/26*    (2006.01)
*B60L 7/18*    (2006.01)
(Continued)

(52) U.S. Cl.
CPC .................. *B60T 8/26* (2013.01); *B60L 3/12* (2013.01); *B60L 7/12* (2013.01); *B60L 7/18* (2013.01);
(Continued)

(58) Field of Classification Search
CPC .... B60T 8/26; B60T 8/1766; B60T 2270/604; B60T 2270/608; B60L 3/12; B60L 7/12; B60L 7/18; B60L 7/26; B60L 11/1861; B60L 15/2009; B60L 2240/423; B60L 2250/26; Y02T 10/645; Y02T 10/7005; Y02T 10/7044; Y02T 10/705; Y02T 10/72; Y02T 10/7275
See application file for complete search history.

(56) References Cited

U.S. PATENT DOCUMENTS

| | | | |
|---|---|---|---|
| 6,292,733 B1 * | 9/2001 | Sugiyama | B60T 8/1766 303/122.05 |
| 6,804,598 B2 | 10/2004 | Eckert et al. | |
| 2003/0216849 A1 | 11/2003 | Eckert et al. | |
| 2006/0196712 A1 | 9/2006 | Toyota et al. | |
| 2010/0113215 A1 | 5/2010 | Jager et al. | |

(Continued)

FOREIGN PATENT DOCUMENTS

| | | | |
|---|---|---|---|
| EP | 2172378 A1 | 4/2010 | |
| JP | 2008179272 A | 8/2008 | |

OTHER PUBLICATIONS

International Search Report for International application No. PCT/EP2013/061785 mailed Aug. 20, 2013.

(Continued)

*Primary Examiner* — Mussa A Shaawat
(74) *Attorney, Agent, or Firm* — Carlson, Gaskey & Olds (57) ABSTRACT

The present invention relates to a brake control system for a motor vehicle having front and rear axles. The brake control system includes a controller operable in response to a braking request signal. The controller is configured to control a front axle braking system for applying a front axle braking force and a rear axle braking system for applying a rear axle braking force. The controller is configured to increase the front axle braking force to supplement the rear axle braking force when an operational parameter relating to the rear axle braking system is greater than or equal to a pre-defined threshold. The invention also relates to a method of controlling the braking of a motor vehicle.

16 Claims, 4 Drawing Sheets

(51) Int. Cl.
  *B60T 8/1766*   (2006.01)
  *B60L 7/26*   (2006.01)
  *B60L 3/12*   (2006.01)
  *B60L 7/12*   (2006.01)
  *B60L 11/18*   (2006.01)
  *B60L 15/20*   (2006.01)

(52) U.S. Cl.
  CPC ............ *B60L 7/26* (2013.01); *B60L 11/1861* (2013.01); *B60L 15/2009* (2013.01); *B60T 8/1766* (2013.01); *B60L 2240/36* (2013.01); *B60L 2240/423* (2013.01); *B60L 2250/26* (2013.01); *B60T 2270/604* (2013.01); *B60T 2270/608* (2013.01); *Y02T 10/645* (2013.01); *Y02T 10/705* (2013.01); *Y02T 10/7005* (2013.01); *Y02T 10/7044* (2013.01); *Y02T 10/72* (2013.01); *Y02T 10/7275* (2013.01)

(56) References Cited

U.S. PATENT DOCUMENTS

| 2010/0198475 | A1  | 8/2010 | Stolzl et al. | |
| 2012/0108387 | A1* | 5/2012 | Akebono | B60W 10/02 477/12 |
| 2012/0108388 | A1* | 5/2012 | Akebono | B60W 10/08 477/12 |
| 2012/0109438 | A1* | 5/2012 | Akebono | B60K 6/48 701/22 |
| 2012/0203406 | A1* | 8/2012 | Akebono | B60W 10/02 701/22 |

OTHER PUBLICATIONS

Combined Search and Evaluation Report for Application No. GB1210066.5 dated Sep. 14, 2013.

* cited by examiner

BRAKING CONTROL SYSTEM

TECHNICAL FIELD

The present invention relates to a braking control system and a method of braking for a motor vehicle having front and rear axles.

BACKGROUND OF THE INVENTION

It is known to provide a brake-by-wire system for controlling motor vehicle braking. The brake-by-wire systems are typically operated by a brake pedal which provides a braking control signal. The total braking force applied to the vehicle typically comprises front and rear axle braking combined with overrun (engine) braking and frictional/aerodynamic braking. The brake-by-wire system can initiate braking by first applying a rear axle braking force before a front axle braking force commences.

The present invention sets out to provide an improved braking system for a motor vehicle.

SUMMARY OF THE INVENTION

Aspects of the invention relate to a brake control system, a motor vehicle and a method of controlling the braking of a motor vehicle.

In a further aspect, the present invention relates to a brake control system for a motor vehicle having front and rear axles, the brake system comprising:
  a controller operable in response to a braking request signal to control a front axle braking system for applying a front axle braking force and a rear axle braking system for applying a rear axle braking force;
  wherein the controller is configured to increase the front axle braking force to supplement the rear axle braking force when an operational parameter relating to the rear axle braking system is greater than or equal to a pre-defined threshold.

In response to a braking request signal, the controller is configured to initiate vehicle braking comprising at least rear axle braking. Once the operating parameter of the rear axle braking system reaches said pre-defined threshold, the controller is configured to increase the front axle braking force to supplement the rear axle braking force. The controller can thereby maintain the operational parameter relating to the rear axle braking system within said pre-defined threshold. The controller can partially or completely substitute the rear axle braking force with the front axle braking force when the operational parameter relating to the rear axle braking system reaches said threshold. The total braking force applied by the front and rear braking systems is at least substantially equal to the braking request signal.

The rear axle braking system can comprise a regenerative braking device and a friction brake. The regenerative braking device can be coupled to an energy storage device, such as a traction battery. The rear axle braking system can comprise a friction brake and/or a regenerative brake. The front axle braking system can also comprise a friction brake and/or a regenerative brake. The friction brake provided at the front axle and/or the rear axle can comprise a brake calliper having pads for engaging a brake disc.

The controller can be configured to actuate a brake modulator to increase the front axle braking force. The brake modulator can provide a boost pressure to the front axle brake system. The controller can be configured to control the rear axle braking system to prioritise regenerative braking over friction braking. The energy recovered by the regenerative braking device can thereby be increased. In response to a brake request signal, the controller can initially engage the regenerative braking device. When the capacity to recover energy under regenerative braking is depleted, the controller can be configured to engage the rear axle friction brakes. The capacity can be defined by an operating load of the regenerative braking device (for example, an operating voltage of an electric motor); and/or a storage capacity of the energy storage device (for example, the state of charge (SOC) of a traction battery).

The controller can be connected to one or more sensors for measuring said operational parameter. The operational parameter can comprise a temperature of the rear axle. The operational parameter can be a temperature of at least one rear axle friction brake(s). The controller can be connected to a temperature sensor for measuring the temperature of the rear axle friction brake. The operational parameter could comprise the operating temperature of the regenerative braking device. Rather than measure the temperature of said at least one rear axle friction brake(s), a temperature model could be employed to estimate the temperature. The controller can implement the temperature model.

The operational parameter can comprise the temperature of the rear axle braking system. The pre-defined threshold can comprise a maximum operating temperature. The front axle braking can be initiated when the rear axle braking system reaches said maximum operating temperature. Alternatively, or in addition, the operational parameter can comprise a time period for which the rear axle braking system is above a maximum temperature. The pre-defined threshold can comprise a maximum period of time for which the rear axle braking system can operate above said maximum temperature. The front axle braking can be initiated when the rear axle braking system has been equal to or greater than said operating temperature for a pre-defined period of time. For example, the pre-defined threshold could specify an operating temperature of greater than 100° C. for a time period of greater than 300 seconds; and/or an operating temperature of greater than 250° C. for a time period of greater than 120 seconds. A threshold table could be defined comprising a plurality of operational temperatures and associated time periods.

The pre-defined threshold can also comprise a stability margin. The controller can be configured to maintain the rear axle braking system within a pre-defined stability margin relative to the front axle braking system. To preserve balance, the controller can control the front and rear axle braking forces to remain within said stability margin.

The controller can be configured to maintain or reduce the rear axle braking force in conjunction with increasing the front axle braking force when said pre-defined threshold is reached.

The invention also relates to a motor vehicle comprising a brake control system as claimed in any one of the preceding claims.

In a further aspect, the present invention relates to a method of controlling the braking of a motor vehicle having front and rear axles, the method comprising:
  receiving a braking request signal;
  operating a rear axle braking system to apply a rear axle braking force; and
  operating a front axle braking system to increase a front axle braking force to supplement the rear axle braking force when an operational parameter relating to the rear axle braking system is greater than or equal to a pre-defined threshold.

The sum of the rear axle braking force and the front axle braking force can be at least substantially equal to the braking request signal. At least the rear axle braking system can be actuated in response to the braking request signal. The method can comprise initiating the front axle braking system after the rear axle braking system in response to receipt of the braking request signal.

The method can comprise actuating a brake modulator to increase the front axle braking force. The brake modulator can provide a boost pressure to the front axle brake system. The step of applying the rear axle braking force can comprise applying regenerative braking and/or friction braking. The friction braking can be performed by at least one friction brake.

The regenerative braking can be performed by a regenerative braking device coupled to an energy storage device. The method can comprise prioritising regenerative braking over friction braking at the front and/or rear axles. The regenerative braking can be performed first, followed by friction braking. The method can comprise applying friction braking on the rear axle when a capacity for storing energy collected under regenerative braking is depleted.

The operational parameter can comprise a temperature of the rear axle. In particular, the operational parameter can comprise a temperature of the rear axle friction brakes. The temperature could be measured by one or more temperature sensors. Alternatively, the temperature can be modelled, for example based on a temperature model and/or historical usage data of the rear axle friction brakes. In addition, the operational parameter can comprise a stability margin.

The method can comprise increasing the front axle braking force when the temperature of the rear axle braking system is greater than or equal to said pre-defined threshold for a defined period of time. The method can thereby protect the rear axle brakes from exposure to a high temperature over a prolonged period of time.

The method can comprise maintaining or reducing the rear axle braking force in conjunction with increasing the front axle braking force after said pre-defined threshold has been reached. The front axle braking force can partially or completely replace the rear axle braking force after the pre-defined threshold has been reached.

The rear axle braking force can be re-applied once the operating parameter of the rear axle braking system has fallen below said pre-defined threshold.

The method(s) described herein can be machine-implemented. The method described herein can be implemented on a computational device comprising one or more processors, such as an electronic microprocessor. The processor(s) can be configured to perform computational instructions stored in memory or in a storage device. The device described herein can comprise one or more processors configured to perform computational instructions.

In a further aspect the present invention relates to a computer system comprising: programmable circuitry; and software encoded on at least one computer-readable medium to program the programmable circuitry to implement the method described herein.

According to a still further aspect the present invention relates to one or more computer-readable media having computer-readable instructions thereon which, when executed by a computer, cause the computer to perform all the steps of the method(s) described herein.

The references herein to the front and rear axles are each to be given their conventional meaning in relation to their relative positions at the front and rear of the assembled vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION

The present invention relates to a brake control system for a motor vehicle having a front axle, a rear axle, an internal combustion engine and a regenerative braking system. A controller is provided for controlling front and rear axle braking based on braking requests from a brake pedal operated by a driver.

Front and rear hydraulic brakes are provided for applying friction braking forces to the front and rear axles respectively. The regenerative braking system comprises an electric motor (for example a crankshaft integrated motor/generator) coupled to the rear axle of the vehicle. The electric motor can operate in a charge mode which it functions as a generator to recover energy under braking and charges a traction battery. Conversely, the electric motor can operate in a drive (boost) mode in which it draws current from the traction battery to provide a tractive force for the vehicle.

The rear axle braking is controlled by electrical braking signals transmitted over a wired connection (so-called brake-by-wire). The front axle braking is controlled by a hydraulic system coupled to the brake pedal in conventional manner. This control arrangement is referred to herein as a partial brake-by-wire system.

The controller according to an embodiment of the present invention utilises a brake map to control rear axle braking. The braking forces applied to the front and rear axles can be controlled independently. In the present embodiment, front axle braking is performed by friction braking, for example by brake callipers contacting a disc brake. It will be appreciated that the front axle braking can be modified to comprise regenerative braking without departing from the present invention. Rear axle braking can comprise friction braking and/or regenerative braking. The controller can define a series limit when rear axle braking is supplemented with front axle braking. Up to the series limit, braking can be performed at least substantially exclusively by rear axle braking. Above the series limit, braking can be performed by a combination of front and rear axle braking. In addition, the vehicle will experience engine braking on the overrun.

Braking forces due to friction and aerodynamic loading will also slow the vehicle and these forms of braking are collectively referred to herein as coastdown braking.

As mentioned above, the braking forces applied to the rear axle of the vehicle can comprise friction braking and/or regenerative braking. The use of regenerative braking is prioritised provided there is capacity available within the regenerative braking system to store the recovered energy (referred to herein as the generator capacity). If there is generator capacity, braking is performed by the regenerative braking system up to the maximum available capacity. If there is no available generator capacity (for example the battery is fully charged), braking is performed exclusively by friction braking on the rear axle. The controller is configured to engage/disengage the regenerative braking in response to changes in the available generator capacity. Thus, the controller can selectively activate the charge or drive (boost) operating modes of the electric motor.

Figure 1:
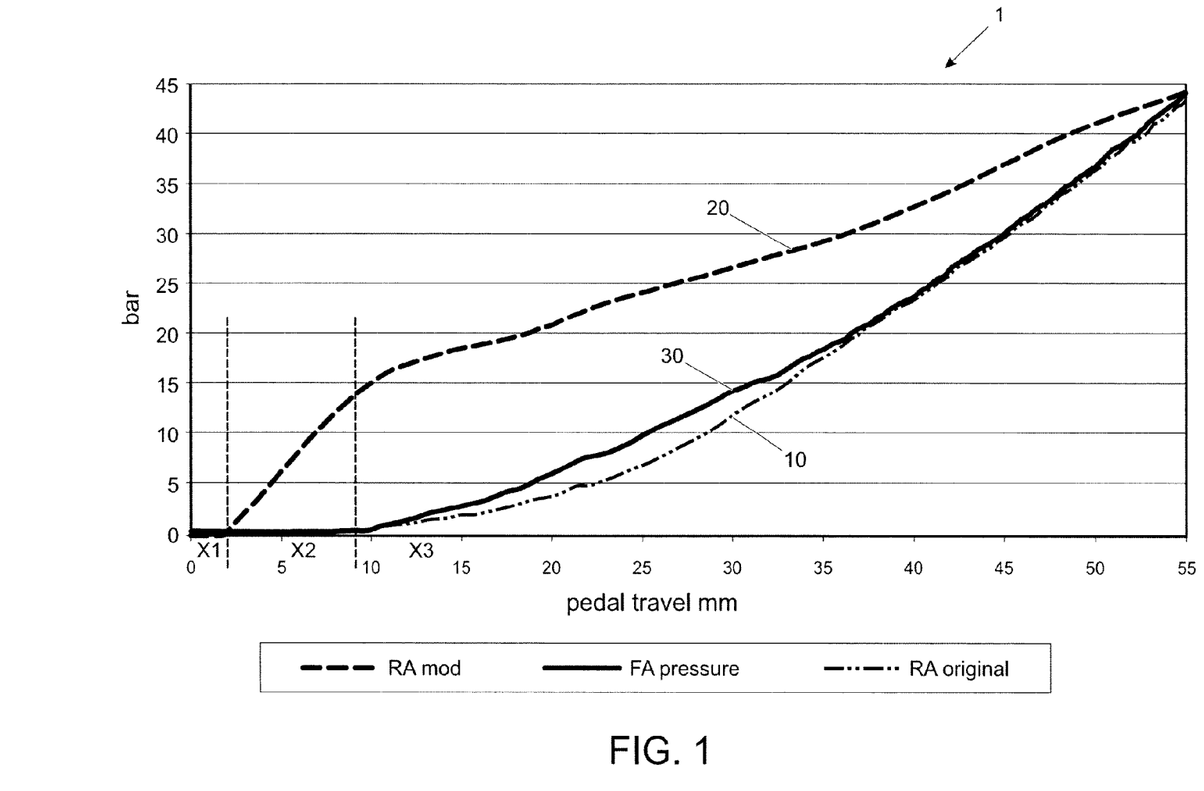
FIG. 1 shows a braking pressure chart illustrating the total braking pressure applied for a given pedal travel in accordance with an embodiment of the present invention.

A braking pressure chart 1 representing a total applied braking pressure (bar) for a given brake pedal travel (mm) is shown in FIG. 1. A conventional rear axle pressure curve 10 shows the braking pressure applied to the rear axle in a conventional system; and a modified rear axle pressure curve 20 shows the modified braking pressure applied to the rear axle in a brake control system according to the present invention. A front axle pressure curve 30 shows the braking pressure applied to the front axle which remains unchanged between the conventional system and the present invention.

When the brake pedal is initially depressed, a first segment ($X_1$) of the brake pedal travel occurs before the controller initiates rear axle braking. A second segment ($X_2$) of brake pedal travel results at least substantially exclusively in rear axle braking. A third segment ($X_3$) of brake pedal travel causes the controller to initiate front axle braking to supplement the rear axle braking. The continued depression of the brake pedal through the third segment ($X_3$) of brake pedal travel promotes both front axle and rear axle braking based on the controller brake map. In the present embodiment, the front axle braking can comprise front axle friction braking, but in a modified brake control system the front axle braking could also comprise front axle regenerative braking. The rear axle braking can comprise rear axle friction braking and/or rear axle regenerative braking.

The conventional rear axle pressure curve 10 shows that front and rear axle braking are initiated substantially simultaneously in the conventional brake system. By altering the brake map to initiate rear axle braking before front axle braking, the controller enables additional regenerative braking in response to a driver brake request. Moreover, as shown in FIG. 1, the controller initially biases the proportion of the total applied braking pressure in favour of the rear axle braking. The controller is thereby provided with a larger operating window inside of which the regenerative braking device can be actuated under normal braking conditions to recover energy.

Performing heavy braking, or braking over an extended period of time, for example when performing a lengthy descent or towing a heavy load, can cause a significant increase in the temperature of the rear axle friction brakes. The controller implements a temperature model to estimate the temperature of the rear axle friction brakes. The temperature model can, for example, utilise the duration for which the rear axle friction brakes are applied; and/or the applied brake pressure to model the temperature of the rear axle friction brakes. The temperature model could also utilise parameters relating to the operation of rear axle regenerative braking. To prevent excessive heating of the rear axle friction brakes, the controller is configured to actuate a brake modulator to increase the braking force applied by the front axle friction brakes when the temperature determined by said temperature model reaches an adaptive temperature threshold. The front axle braking can provide a boost function to supplement rear axle braking if the estimated temperature of the rear axle reaches the temperature threshold. The operation of the controller will now be described with reference to FIGS. 2 and 3.

Figure 2:
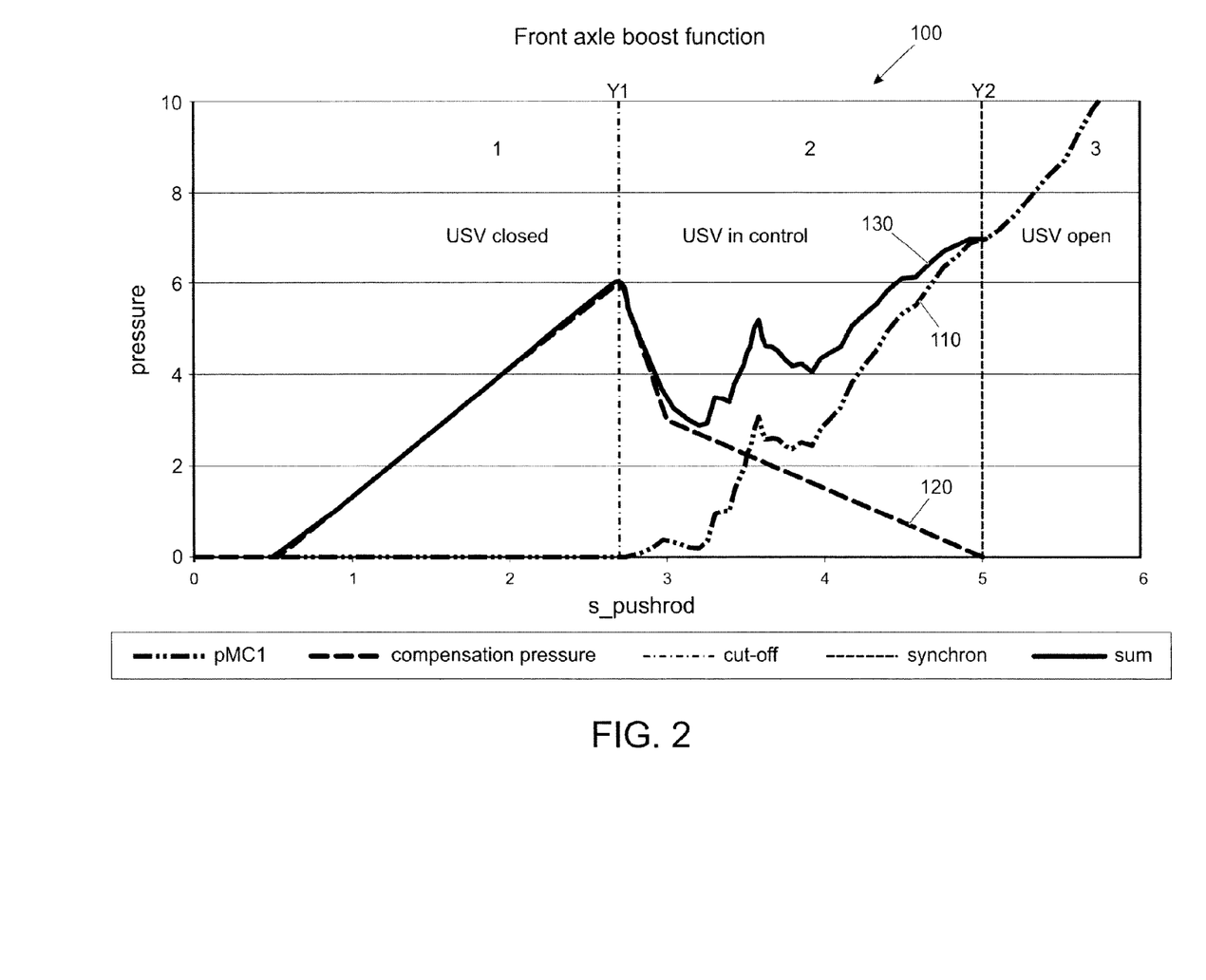
FIG. 2 shows a front axle boost pressure map illustrating the application of a boost pressure to the front axle.

The controller actuates the brake modulator to apply a boost brake pressure to supplement the brake pressure in the master brake cylinder. A front axle boost pressure map 100 is shown in FIG. 2 representing the brake pressure applied at the front axle in response to displacement of a brake pedal by a driver. A pressure in the master cylinder is represented by a master cylinder pressure curve 110; and a compensation pressure generated by the brake modulator is represented by a compensation pressure curve 120. The total front axle brake pressure is represented by a cumulative pressure curve 130. A modulator cut-off point Y1 and a synchronisation point Y2 are also illustrated in FIG. 2.

The master cylinder pressure is zero for initial brake pedal travel and, therefore, does not assist with front axle braking. To supplement rear axle braking, the controller actuates the brake modulator to generate a brake pressure which is linearly proportional to pedal travel. When the master cylinder is pressurised (from cut-off point Y1), the controller controls the brake modulator to reduce the compensation pressure. The compensation pressure is initially reduced at a high rate and thereafter at a low rate as the master cylinder pressure increases. The compensation pressure applied by the brake modulator is reduced to zero when the total front axle braking pressure is applied by the master cylinder (synchronisation point Y2).

The operation of the controller to integrate front axle brake pressure applied by the brake modulator and the master cylinder has been described with reference to brake pedal position. However, the same techniques are used to apply a boost brake pressure to replace or supplement rear axle braking. By applying a boost brake pressure at the front axle, the controller can reduce rear axle braking to facilitate cooling. The controller can progressively reduce the boost brake pressure as the pressure in the master brake cylinder increases.

Figure 3:
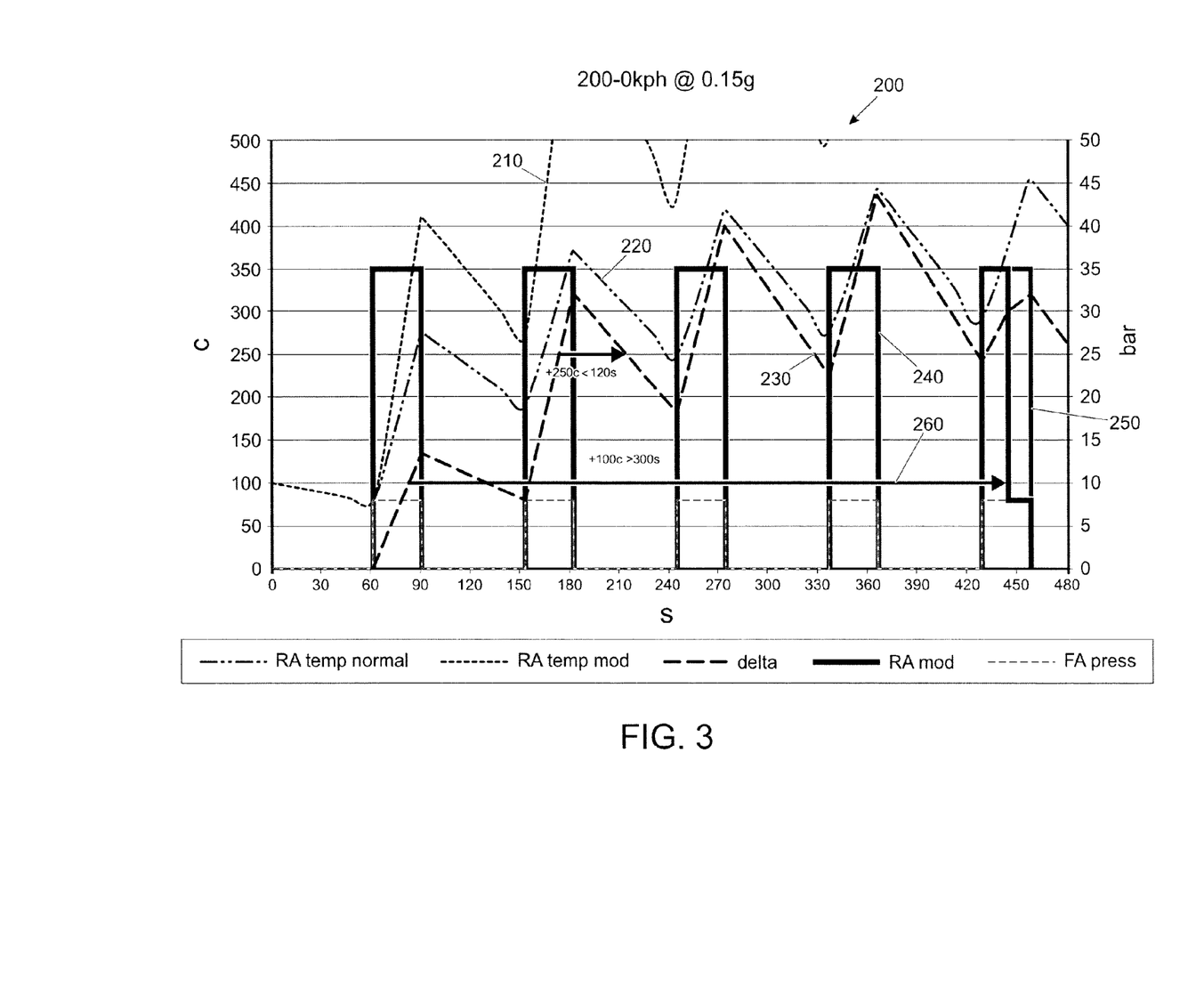
FIG. 3 shows a temperature chart representing the modelled temperature of the rear axle in response to repeated rear axle braking.

The boost function is typically applied when a temperature of the rear axle friction brakes is equal to or exceeds a pre-defined temperature for a period of time greater than a pre-defined period of time. The threshold temperature is modelled using a temperature model based on usage of the rear axle friction brakes. By way of example, a temperature chart 200 is shown in FIG. 3 representing the calculated rear axle temperature in response to a digital brake request signal (not shown). The temperature chart 200 comprises a normal rear axle temperature curve 210 and a modified rear axle temperature curve 220 representing the modelled temperature (° C.) against time (sec). The difference in temperature between the normal and modified rear axle curves 210, 230 is represented by a delta curve 230. A rear axle brake pressure (bar) is represented by a rear axle pressure curve 240; and a front axle brake pressure (bar) is represented by a front axle pressure curve 250.

Application of the rear axle friction brakes causes an increase in temperature which drops when the brakes are not in use. The controller uses the temperature model to check for exposure of the friction brakes to temperatures above the temperature threshold for a pre-defined period of time. In the illustrated example, the temperature exceeds 100° C. for a period of time greater than 300 seconds, as illustrated by a tracking arrow 260. When this condition is identified, the controller actuates the front axle boost brake pressure to replace the rear axle friction brakes. This transition is illustrated by a truncated application of the rear axle friction brakes and a corresponding increase in the front axle braking applied by the brake modulator. The controller can thereby protect the rear axle friction brakes from exposure to excessive temperatures over an extended period of time. Accordingly, the controller can protect the brake callipers, brake pads and brake discs.

The controller is also configured to maintain the brake distribution between the front and rear axles. Specifically, a stability threshold is defined to limit the difference in the braking force applied to the front and rear axles. The controller maintains rear axle braking within a prescribed stability threshold relative to the front axle braking. In the present embodiment, the brake map is profiled to limit the difference between the braking forces applied to the front and rear axles to a force sufficient to cause vehicle deceleration of approximately 1 m/s$^2$.

Figure 4:
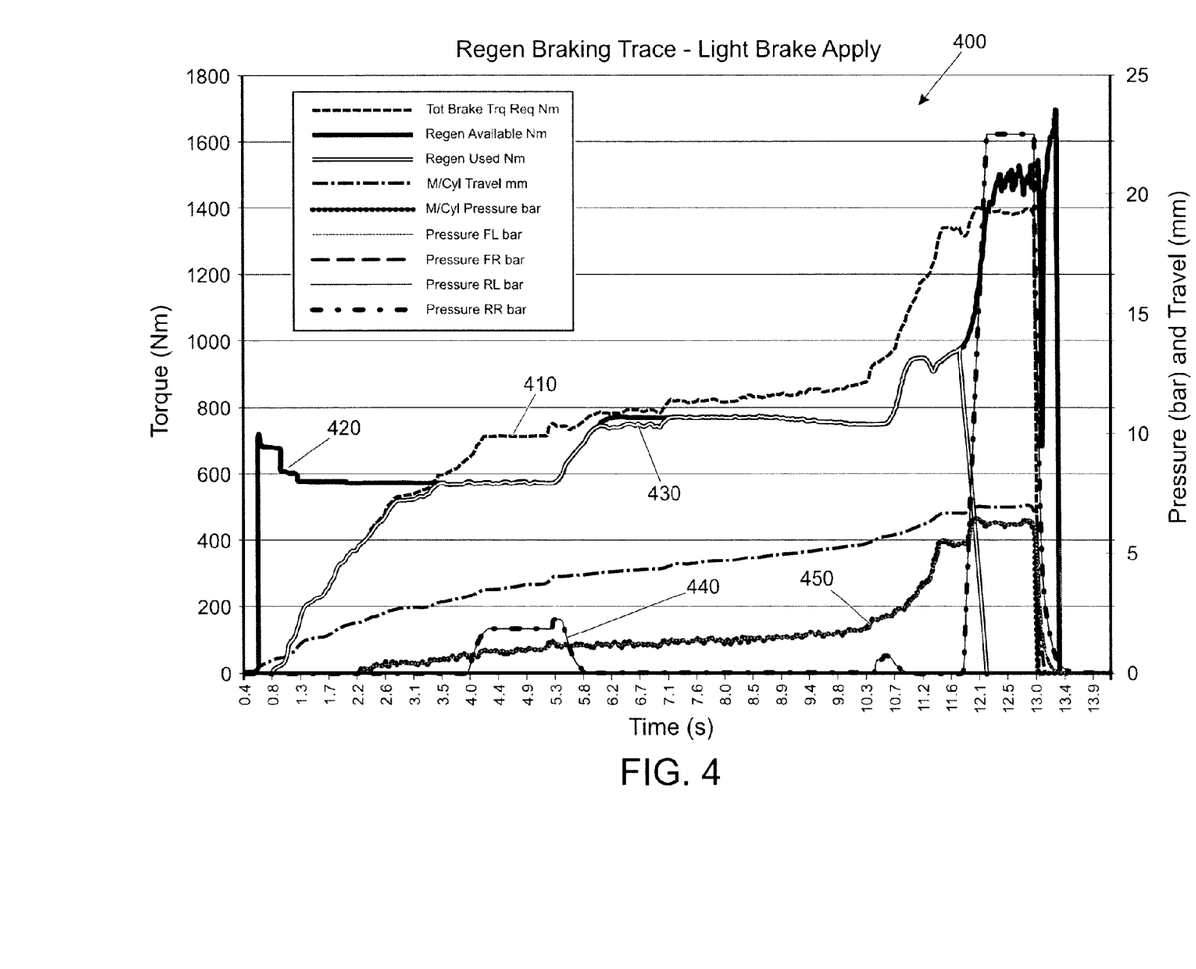
FIG. 4 shows a brake torque chart representing the braking torque applied in response to a driver braking request.

A brake torque chart 400 showing the braking torque (Nm) applied in response to a driver braking request over time (s) is shown in FIG. 4. The brake torque chart 400 comprises a driver brake request curve 410; an available regenerative braking curve 420; a used regenerative braking curve 430; a rear axle brake pressure curve 440; and a master cylinder pressure curve 450.

The driver brake request curve 410 represents the braking torque (Nm) demanded by the driver. The available regenerative braking curve 420 represents the maximum available regenerative braking torque (Nm) that can be applied at the rear axle by the regeneration device. The used regenerative braking curve 430 shows the regenerator braking torque (Nm) applied when the regeneration device is actuated to recover energy. The rear axle brake pressure curve 440 shows the brake pressure (bar) applied at each wheel coupled to the rear axle of the vehicle. The master cylinder pressure curve 450 shows the pressure (bar) in the master cylinder which corresponds to the brake pressure (bar) applied at each wheel coupled to the front axle of the vehicle.

The controller controls the regenerative braking (used regenerator curve 430) and rear axle friction braking (rear axle brake pressure curve 440) such that, when combined with the front axle friction braking (master cylinder pressure curve 450), the combined braking torque equals the brake torque demanded by the driver (driver brake request curve 410).

In the event that the temperature model determines that the temperature of the rear axle is equal to or higher than the adaptive threshold temperature, the controller will actuate the modulator to apply a boost pressure to the front axle friction brakes to satisfy the driver brake demand (driver brake request curve 410). The controller can then maintain or reduce the braking force applied at the rear axle (by the regenerative device and/or rear axle friction brakes) to allow heat to dissipate. A gradual transfer between the rear axle braking torque and the front axle braking torque can be implemented by the controller.

The controller could also model the temperature of the regeneration device and apply friction braking (to the front axle and/or the rear axle) if the thermal loading on the regeneration device exceeds a threshold operating temperature. Of course, the temperature of the regeneration device could be measured by one or more temperature sensors.

It will be appreciated that various changes and modifications can be made without departing from the spirit and scope of the present invention. For example, although the invention has been described with reference to a partial brake-by-wire system, it is envisaged that the techniques according to the present invention could also be applied to a full brake-by-wire system.

Although the present invention has been described with reference to a hybrid vehicle having an internal combustion engine, it could be employed in an electric vehicle (EV). The front and/or rear axles of the vehicle could be driven by one or more electric motors. Further aspects of the present invention are known from the following numbered paragraphs:

1. A brake control system for a motor vehicle having front and rear axles, the brake system comprising:
    a controller operable in response to a braking request signal to control a front axle braking system for applying a front axle braking force and a rear axle braking system for applying a rear axle braking force;
    wherein the controller is configured to increase the front axle braking force to supplement the rear axle braking force when an operational parameter relating to the rear axle braking system is greater than or equal to a pre-defined threshold.

2. A brake control system as described in paragraph 1, wherein the rear axle braking system comprises a rear axle friction brake and a regenerative brake system.

3. A brake control system as described in paragraph 2, wherein the controller is configured to control the rear axle braking system to prioritise the regenerative brake over the friction brake.

4. A brake control system as described in paragraph 2, wherein the controller is configured to actuate a brake modulator to increase the front axle braking force.

5. A brake control system as described in paragraph 1, wherein the operational parameter comprises a temperature of the rear axle braking system.

6. A brake control system as described in paragraph 5, wherein the controller is configured to increase the front axle braking force when the temperature of the rear axle braking system is greater than or equal to said pre-defined threshold for a defined period of time.

7. A brake control system as described in paragraph 5, wherein the controller implements a temperature model to estimate the temperature of the rear axle braking system.

8. A brake control system as described in paragraph 1, wherein the controller is configured to maintain or reduce the rear axle braking force in conjunction with increasing the front axle braking force when said pre-defined threshold is reached.

9. A motor vehicle comprising a brake control system as described in paragraph 1.

10. A method of controlling the braking of a motor vehicle having front and rear axles, the method comprising:
    receiving a braking request signal;
    operating a rear axle braking system to apply a rear axle braking force; and
    operating a front axle braking system to increase a front axle braking force to supplement the rear axle braking force when an operational parameter relating to the rear axle braking system is greater than or equal to a pre-defined threshold.

11. A method as described in paragraph 10, wherein the step of applying the rear axle braking force comprises applying regenerative braking and/or friction braking.

12. A method as described in paragraph 11, wherein the method comprises prioritising regenerative braking over friction braking.

13. A method as described in paragraph 11, wherein the method comprises actuating a brake modulator to increase the front axle braking force.

14. A method as described in paragraph 10, wherein the operational parameter comprises a temperature of the rear axle.

15. A method as described in paragraph 14, wherein the method comprises increasing the front axle braking force when the temperature of the rear axle braking system is greater than or equal to said pre-defined threshold for a defined period of time.

The invention claimed is:

1. A brake control system for a motor vehicle having front and rear axles, the brake system comprising:
    a controller operable in response to a braking request signal to control a front axle braking system for applying a front axle braking force and a rear axle braking system for applying a rear axle braking force;
    wherein the controller is configured to increase the front axle braking force to supplement the rear axle braking force when a temperature of the rear axle braking system is greater than or equal to a pre-defined threshold for a defined period of time based on a maximum period of time the rear axle braking system can operate above the pre-defined threshold.

2. A brake control system as claimed in claim 1, wherein the rear axle braking system comprises a rear axle friction brake and a regenerative brake system.

3. A brake control system as claimed in claim 1, wherein the controller is configured to control the rear axle braking system to prioritise the regenerative brake over the friction brake.

4. A brake control system as claimed in claim 1, wherein the controller is configured to actuate a brake modulator to increase the front axle braking force.

5. A brake control system as claimed in claim 2, wherein the controller is configured to increase the front axle braking force to supplement the rear axle braking force when the temperature of the rear axle friction brake is greater than or equal to said pre-defined threshold for said defined period of time.

6. A brake control system according to claim 5 comprising a hydraulic system coupled to the brake a pedal, wherein said brake pedal is operative to, in one segment of brake pedal travel movement to substantially exclusively provide rear axle braking and in a subsequent segment of brake pedal travel movement to cause the controller to initiate front axle braking to supplement the rear axle braking.

7. A brake control system according to claim 6 wherein the rear axle braking is controlled by electrical braking signals transmitted over a wired connection, and wherein the brake modulator is operable in both the segments of brake travel movement to increase hydraulic pressure to supplement the master brake cylinder of the braking system so as to increase front wheel braking independently of rear wheel braking.

8. A brake control system as claimed in claim 1, wherein the controller implements a temperature model to estimate the temperature of the rear axle braking system.

9. A brake control system as claimed in as claimed in claim 1, wherein the controller is configured to maintain or reduce the rear axle braking force in conjunction with increasing the front axle braking force when said pre-defined threshold is reached.

10. A motor vehicle comprising a brake control system as claimed in as claimed in claim 1.

11. A method of controlling the braking of a motor vehicle having front and rear axles, the method comprising:
    receiving a braking request signal;
    operating a rear axle braking system to apply a rear axle braking force; and
    operating a front axle braking system to increase a front axle braking force to supplement the rear axle braking force when a temperature of the rear axle braking system is greater than or equal to a pre-defined threshold for a defined period of time based on a maximum period of time the rear axle braking system can operate above the pre-defined threshold.

12. A method as claimed in claim 11, wherein the step of applying the rear axle braking force comprises applying regenerative braking and/or friction braking.

13. A method as claimed in claim 11, wherein the method comprises prioritising regenerative braking over friction braking.

14. A method as claimed in claim 2, wherein the method comprises actuating a brake modulator to increase the front axle braking force.

15. A method as claimed in claim 12, wherein the method comprises increasing the front axle braking force to supplement the rear axle braking force when the temperature of the rear axle friction brake is greater than or equal to said pre-defined threshold for said defined period of time.

16. A computational device comprising one or more processors configured to perform computational instructions stored in a memory thereof such that is operable to:
    receive a braking request signal;
    operate rear axle braking system to apply a rear axle braking force; and when a temperature of the rear axle braking system is greater than or equal to a predefined threshold for a defined period of time based on a maximum period of time the rear axle braking system can operate above the pre-defined threshold, operate a front axle braking system to increase a front axle braking force to supplement the rear axle braking force.

* * * * *

UNITED STATES PATENT AND TRADEMARK OFFICE
CERTIFICATE OF CORRECTION

PATENT NO. : 9,718,449 B2
APPLICATION NO. : 14/405425
DATED : August 1, 2017
INVENTOR(S) : Anna Newberry et al.

Page 1 of 1

It is certified that error appears in the above-identified patent and that said Letters Patent is hereby corrected as shown below:

In the Claims

Claim 3, Column 9, Line 32; replace "in claim 1" with --in claim 2--

Claim 6, Column 9, Line 46; replace "the brake a pedal" with --a brake pedal--

Claim 9, Column 10, Line 9; delete first instance of "as claimed in"

Claim 10, Column 10, Line 15; delete "claimed in as"

Claim 13, Column 10, Line 31; replace "in claim 11" with --in claim 12--

Claim 16, Column 10, Line 44; replace "such that is operable" with --such that the device is operable--

Claim 16, Column 10, Line 46; replace "operate rear" with --operate a rear--

Signed and Sealed this
Twenty-fifth Day of September, 2018

Andrei Iancu
*Director of the United States Patent and Trademark Office*